(12) United States Patent
Prabhakara et al.

(10) Patent No.: US 9,158,734 B1
(45) Date of Patent: Oct. 13, 2015

(54) METHOD AND APPARATUS FOR ELASTIC PROVISIONING

(75) Inventors: Janardhan D. Prabhakara, Richardson, TX (US); Brian D. Burck, Richardson, TX (US); Bennett L. Perkins, Houston, TX (US); Jeffrey B. Gibson, Frisco, TX (US); Sukesh Kumar Biddappa, Murphy, TX (US)

(73) Assignee: EMC CORPORATION, Hopkinton, MA (US)

( * ) Notice: Subject to any disclaimer, the term of this patent is extended or adjusted under 35 U.S.C. 154(b) by 0 days.

(21) Appl. No.: 13/435,317

(22) Filed: Mar. 30, 2012

(51) Int. Cl.
*G06F 15/173* (2006.01)
*G06F 15/16* (2006.01)
*H04L 12/911* (2013.01)

(52) U.S. Cl.
CPC .............. *G06F 15/173* (2013.01); *G06F 15/16* (2013.01); *H04L 47/70* (2013.01)

(58) Field of Classification Search
CPC ......... H04L 47/70; H04L 67/10; H04L 41/00; G06F 15/16
USPC .......................................... 709/224, 225, 226
See application file for complete search history.

(56) References Cited

U.S. PATENT DOCUMENTS

| | | | |
|---|---|---|---|
| 7,194,538 B1 | 3/2007 | Rabe et al. | |
| 2006/0112247 A1 | 5/2006 | Ramany et al. | |
| 2009/0276771 A1* | 11/2009 | Nickolov et al. | 717/177 |
| 2011/0022812 A1* | 1/2011 | van der Linden et al. | 711/163 |
| 2011/0252420 A1 | 10/2011 | Tung et al. | |
| 2013/0055249 A1 | 2/2013 | Vaghani et al. | |

OTHER PUBLICATIONS

Vblock infrastructure Platforms Series 300 Architecture Overview, Version 2.4, Aug. 2011, The Virtual Computing Environment Company, www.vce.com, 74 pages.
Cicso Unified Computing System EMC VNXe3300 Unified Storage System, White paper, Jan. 2011, Revision 1.0, EMC², Cisco Systemss, Inc., 170 West Tasman Drive, San Jose, CA 95134-1706, www.cicso.com, 9 pages.
EMC Integrated Infrastructure for VMware Enabled by EMC VNXe3100 and VMware vSphere 4,1, An Architectural Overview, White Paper, EMC Global Solutions, EMC², Feb. 2011, 24 pages.
VMware vStorage APIs for Array Integration with EMC VNX Series for NAS, Benefits of EMC VNX for File Integration with VMware VAAI White Paper, EMC Solutions Group, Jan. 2012, EMC², 17 pages.
Vblock™ Infrastructure Platforms 2010 Vblock Platforms Architecture Overview, Version 1.3, Nov. 2011, The Virtual Computing Environment Company, www.vce.com, 25 pages.
Best Practices for Deploying VMware vCloud Director on Vblock Infrastructure Plafforms, Sep. 2011, The Virtual Company Environment Company, www.vce.com, 20 pages.

(Continued)

*Primary Examiner* — Vivek Srivastava
*Assistant Examiner* — Normin Abedin
(74) *Attorney, Agent, or Firm* — Daly, Crowley, Mofford & Durkee, LLP

(57) ABSTRACT

Methods and apparatus for a cloud storage system to add a first one of a compute, network, and/or storage layer resource to the service, provision the added first one of the compute, network, and/or storage layer resources, and activate the provisioned first one of the compute, network, and/or storage layer resources into the already provisioned service with minimal interruption of the service to elastically add a resource to the service.

17 Claims, 15 Drawing Sheets

(56) References Cited

OTHER PUBLICATIONS

Service Catalog Strategies for Vblock™ Infrastructure Platforms, IaaS COE, Jan. 2011, The Virtual Computing Environment Company, www.vce.com, 19 pages.
Unified Infrastructure Manager/Provisioning, © 2011 VCE Company, The Virtual Computing Environment Company, www.vce.com, 3 pages.
Vblock™ Infrastructure Platforms Technical Overview, © 2011 VCE Company, The Virtual Computing Environment Company, www.vce.com, 8 pages.
Vblock™ Solution for Trusted Multi-Tenancy: Technical Overview, Aug. 2011, The Virtual Computing Environment Company, www.vce.com, 75 pages.
U.S. Appl. No. 13/435,146, filed Mar. 30, 2012.
U.S. Appl. No. 13/435,146, filed Mar. 30, 2012, Crable.
U.S. Appl. No. 13/629,017, filed Sep. 27, 2012, Crable, et al.
U.S. Appl. No. 13/536,705, filed Jun. 28, 2012, Beach, et al.
U.S. Appl. No. 13/536,017, filed Sep. 27, 2012.
U.S. Appl. No. 13/536,706, filed Jun. 28, 2012.
U.S. Appl. No. 13/536,705 Office Action dated Mar. 27, 2014, 15 pages.
Office Action dated Aug. 15, 2013, U.S. Appl. No. 13/435,146, 27 pages.
U.S. Appl. No. 13/629,017 Notice of Allowance dated Sep. 2, 2014, 18 pages.
Office Action dated May 1, 2014 for U.S. Appl. No. 13/435,146, filed Mar. 30, 2012,
U.S. Appl. No. 13/536,705 Response filed Jul. 21, 2014 8 pages.
U.S. Appl. No. 13/536,705 Notice of Allowance filed Jun. 28, 2012 14 pages.
U.S. Appl. No. 14/534,416, filed Nov. 6, 2014, Beach et al.
Response to Office Action dated Aug. 15, 2013, U.S. Appl. No. 13/435,146, 17 pages.

* cited by examiner

METHOD AND APPARATUS FOR ELASTIC PROVISIONING

BACKGROUND

As is known in the art, storage systems, such as so-called, cloud storage systems, contain a large number of hardware devices and components and software applications, modules, and component. Known systems typically do not provide end-to-end provisioning of resources, such as installing an operating system on the compute resource. Several provisioning operations have to be performed by skilled personnel having in-depth knowledge of the domain and technology of the underlying hardware making it an error prone process. In these systems, the act of provisioning and adding a provisioned resource to a live service are disjoint, separate activities.

SUMMARY

Exemplary embodiments of the invention provide methods and apparatus for elastically adding and provisioning multiple resources, such as compute, storage and/or network resources, into an already provisioned service. In general, the modified service behaves the same after resources have been added as if the service was originally provisioned with the added resources. In exemplary embodiments, resources can be elastically decommissioned and the resources added to respective pools for re-provisioning. A resource added to the service is available immediately with minimal or no service interruption. With this arrangement, a system can provision and make available resources as an atomic operation. Moreover multiple changes can be affected all at the same time provided the resources are available as a single operation while the service continues to fulfill intended objectives of hosting and servicing virtual Machines While exemplary embodiments of the invention are shown and described in conjunction with certain configurations, components, and process flows, it is understood that embodiments of the invention are applicable to networks in general in which elastic provisioning is desirable.

In one aspect of the invention, a method comprise: in a cloud storage system having a compute layer, a network layer, a storage layer and a management layer, and a service having at least one server, boot storage for each of the at least one servers, shared storage for the at least one server, and a network profile to define networks over which traffic can flow, adding a first one of a compute, network, and/or storage layer resource to the service, provisioning the added first one of the compute, network, and/or storage layer resources, activating the provisioned first one of the compute, network, and/or storage layer resources into the already provisioned service with minimal interruption of the service to elastically add a resource to the service.

In another aspect of the invention, an article comprises: a computer readable medium having non-transitory stored instructions that enable a machine to perform: in a cloud storage system having a compute layer, a network layer, a storage layer and a management layer, and a service having at least one server, boot storage for each of the at least one servers, shared storage for the at least one server, and a network profile to define networks over which traffic can flow, adding a first one of a compute, network, and/or storage layer resource to the service, provisioning the added first one of the compute, network, and/or storage layer resources, activating the provisioned first one of the compute, network, and/or storage layer resources into the already provisioned service with minimal interruption of the service to elastically add a resource to the service.

In a further aspect of the invention, a system comprises: a cloud storage system having a compute layer, a network layer, a storage layer and a management layer, and a service having at least one server, boot storage for each of the at least one servers, shared storage for the at least one server, and a network profile to define networks over which traffic can flow, the management layer comprising a processor and stored instructions to enable the system to: add a first one of a compute, network, and/or storage layer resource to the service, provision the added first one of the compute, network, and/or storage layer resources, and activate the provisioned first one of the compute, network, and/or storage layer resources into the already provisioned service with minimal interruption of the service to elastically add a resource to the service.

BRIEF DESCRIPTION OF THE DRAWINGS

The foregoing features of this invention, as well as the invention itself, may be more fully understood from the following description of the drawings in which.

DETAILED DESCRIPTION

Figure 1:
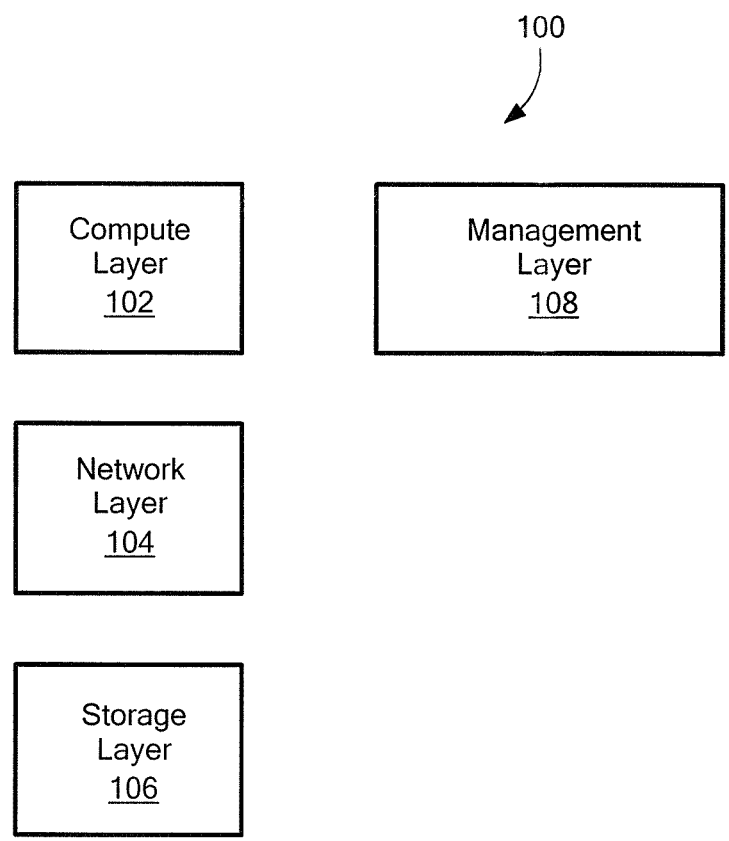
FIG. 1 is a high level schematic representation of a cloud storage system having elastic provisioning in accordance with exemplary embodiments of the invention.

FIG. 1 shows an exemplary cloud storage environment 100 having a compute layer 102, a network layer 104, a storage layer 106, and a management layer 108. The environment may be referred to as a platform. It is understood that any practical number of platforms can be combined into a cloud storage environment.

The compute layer 102 comprises components, such as blade servers, chassis and fabric interconnects that provide the computing power for the platform. The storage layer 106 comprises the storage components for the platform. The network layer 104 comprises the components that provide switching and routing between the compute and storage layers 102, 106 within and between platforms, and to the client or customer network.

Figure 2:
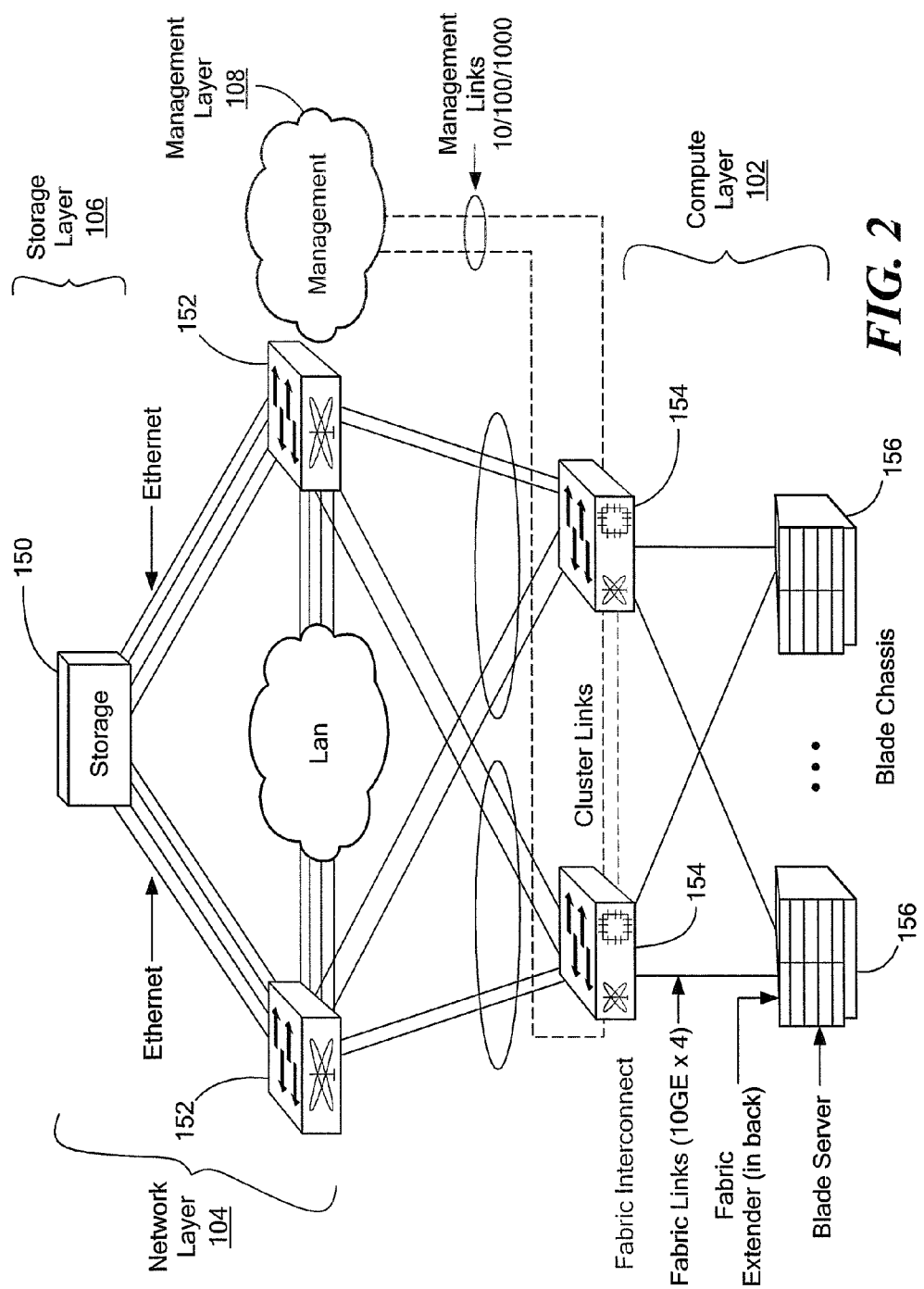
FIG. 2 is a schematic representation showing further detail of the cloud storage system of FIG. 1 including interconnections.

FIG. 2 shows further detail for the environment 100 of FIG. 1. The storage layer 106 can include storage components 150, such as CLARIION storage components from EMC Corporation of Hopkinton Mass. The network layer 104 can include a pair switches 152, such as MDS 9000 Series Multilayer SAN Switches from Cisco of San Jose, Calif., coupled to the storage components and to a LAN. The compute layer 102 can include a pair of fabric interconnects 154, such as CISCO 6100 series devices. The compute layer can further include a number of blade servers 156, such as CISCO 5100 blade chassis. The management layer 108 can be coupled to the compute layer 102.

Figure 3:
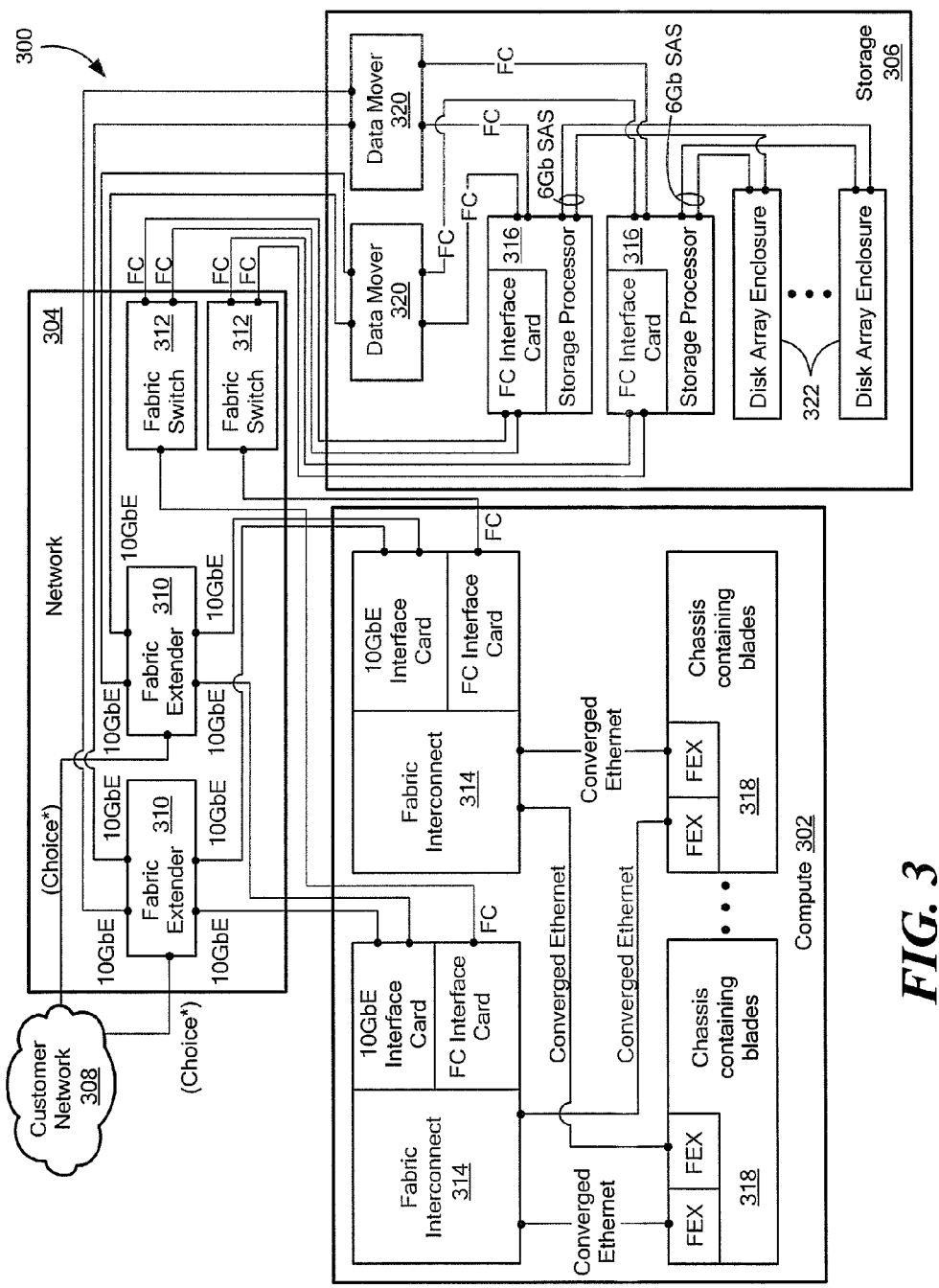
FIG. 3 is a schematic representation showing further detail of the cloud storage system of FIG. 2 including system components.

FIG. 3 shows further detail of an exemplary cloud environment having a compute layer 302, a network layer 304 and a storage layer 306. The network layer 302 is coupled to a customer network 308 in a manner known in the art. The network layer 302 includes switches 310 coupled to the customer network 308. The network layer 302 also includes multilayer fabric switches 312 coupled to fabric interconnects 314 in the compute layer 302 and to storage processors 316 in the storage layer 306. The fabric interconnects 314 are coupled to blade server chassis 318 containing blades. Data movers 320 in the storage layer 306 are coupled between the storage processors 316 and the switches 310 in the network layer. Disk array enclosures 322 are coupled to the storage processors 316.

Figure 4:
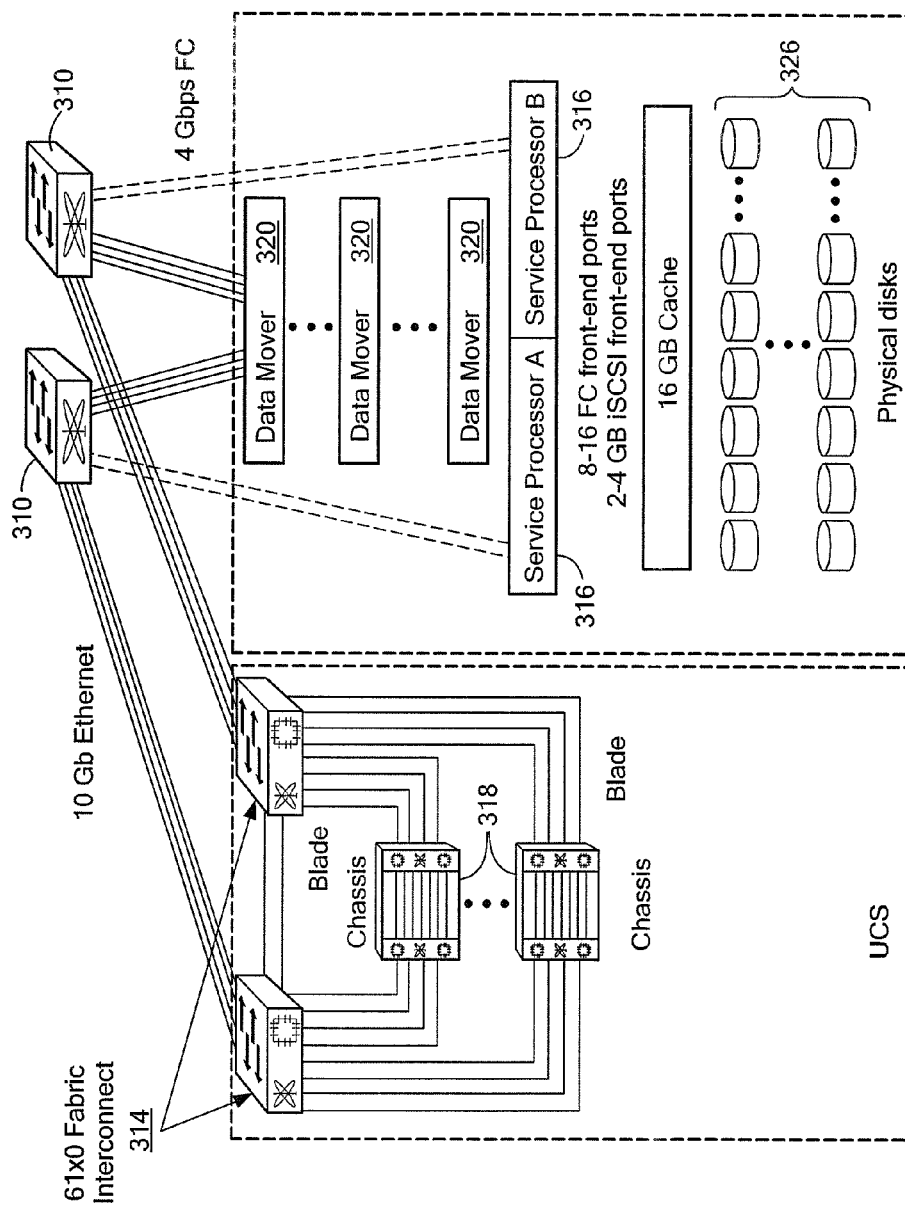
FIG. 4 is a schematic representation showing further detail of a storage layer of the cloud storage system of FIG. 3.

FIG. 4 shows interconnections for a system similar to that shown in FIG. 3 with physical disks 326. In the illustrated embodiment, the storage layer includes 8 to 16 front end fibre channel ports and 2-4 GB iSCSI front end ports.

It is understood that a variety of other configurations having different interconnections and storage configuration can be provided to meet the needs of a particular application.

The management layer can include a number of applications to perform various functions for overall control, configuration, etc of the various platform components. For example, management applications can include a virtualization function, such as VSPHERE/VCENTER, by VMware of Palto Alto, Calif. A further management application can be provided as the Unified Computing System (UCS) by Cisco. It is understood that the blade chassis and fabric interconnection can be considered part of the UCS. Another management application can includes a management interface, such as EMC UNISPHERE, to provide a flexible, integrated experience for managing existing storage systems, such as CLARIION and CELERRA storage devices from EMC. A further management application includes a platform element manager, such as Unified Infrastructure Manager (UIM) by EMC, for managing the configuration, provisioning, and compliance of the platform.

Figure 5:
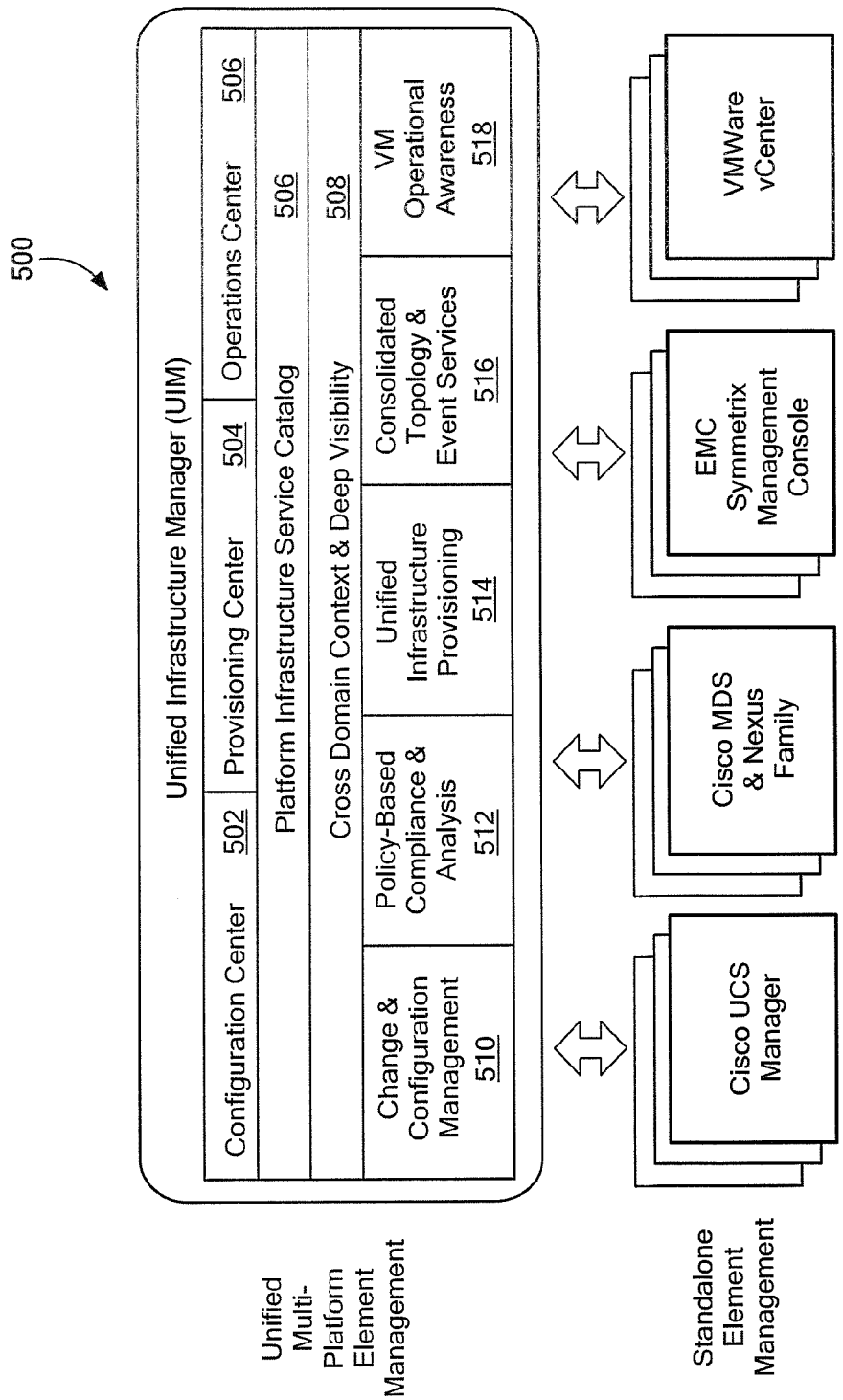
FIG. 5 is a schematic representation of a unified infrastructure manager (UIM) module showing component layering or stack.

FIG. 5 shows an exemplary unified infrastructure manager 500 having elastic provisioning in accordance with exemplary embodiments of the invention. In one embodiment, the unified infrastructure manager 500 includes a configuration center module 502, a provisioning center module 504, and an operations center module 506. Below these modules, is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage layers, and other management applications.

The unified infrastructure manager 500 performs platform deployment by abstracting the overall provisioning aspect of the platform(s) and offering granular access to platform components for trouble shooting and fault management.

Figure 6:
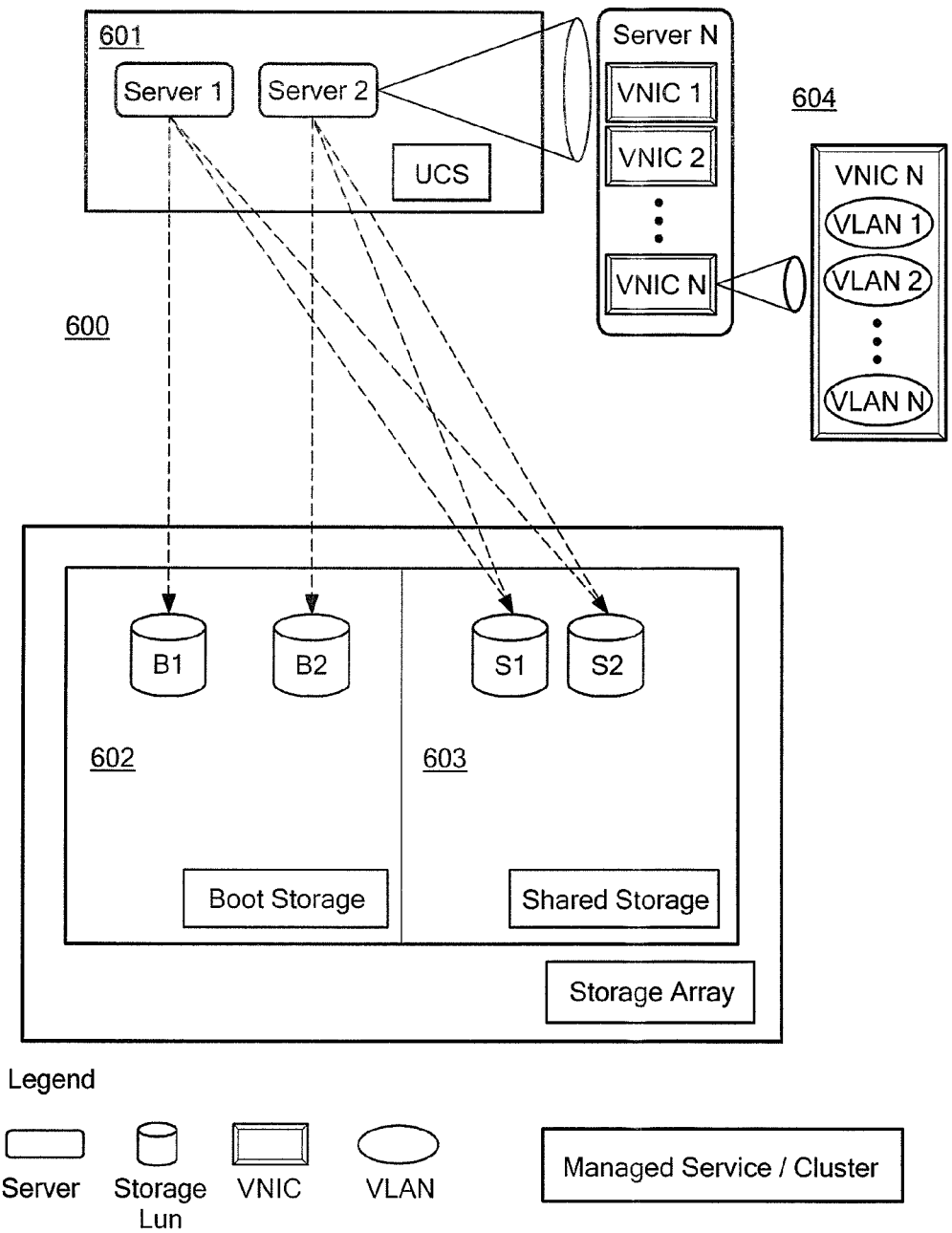
FIG. 6 is a schematic representation of a managed service having server, storage, and network components.

FIG. 6 shows a logical break down of a managed service 600 into primary components. It is understood that connectivity between compute and storage components varies according to the type and configuration of the VBlock. A managed service is the instantiation of logical settings on physical hardware. A service may not span multiple domains and is based on a technology or resource that the service provides. A managed service in UIM is comprises various resources, which are described below Virtual server 601 generally represents a "Service Profile" in the UCS. In one embodiment, a server encapsulates a "blade" which is an atomic compute resource and an operating system installed/to be installed on the said blade. It is understood that there can be one or more servers in a managed service. The server 601 can host multiple Virtual Machines (VM), which require a Virtual Computing platform such as VMWare ESX/ESXi to be installed on the blade associated with the server. It is understood that any suitable platform can be used.

The managed service 600 has associated storage which can further be classified as boot storage 602 and shared storage 603. The definition of boot and shared storage along with gradation/categorization of the said storage constitutes the storage profile of the service. The boot storage 602 is exclusively reserved for the operating system and is unique for each server in the service. The shared storage 603 is intended for data and applications, and is shared across all servers in a service. In other words all servers 601 in the service 600 have access to shared volumes earmarked for the service and when new storage is added "elastically" all the existing servers in the service gain access by means of appropriate provisioning to the newly added and provisioned shared storage.

In general, the UIM abstracts storage types into categories. From a user's point of view, the line items in the storage profile simply consist of a "category" and capacity, which is the size of the storage volume that is eventually created on the storage array and associated with the service/server.

The managed service 600 further includes a network profile 604. The managed service 600 needs to define a set of networks over which network traffic can flow. A virtual network interface card (VNIC) configured against a server is in turn associated with one or more networks (VLANs). If and when servers are added "elastically" to the service, they inherit the network characteristics of the service 600 based on which servers were configured. Thus, the elastically added server will be provisioned with the same set of VNICs (and VLANs) as the servers in the service that predate it. Advanced settings such as Quality of Service (QoS) settings and pin groups are hidden from the end user but configured in the administration components of UIM.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed to mean a generic product, function, or module.

In one aspect of the invention, clusters or managed services are created on a cloud computing environment In general, managed services (services henceforth) or clusters in the platform are mutable and adaptable based on customer needs, usage monitoring, and the like. Added resources are fully provisioned and available as soon as they are provisioned in an automated fashion without service interruption.

Figure 7:
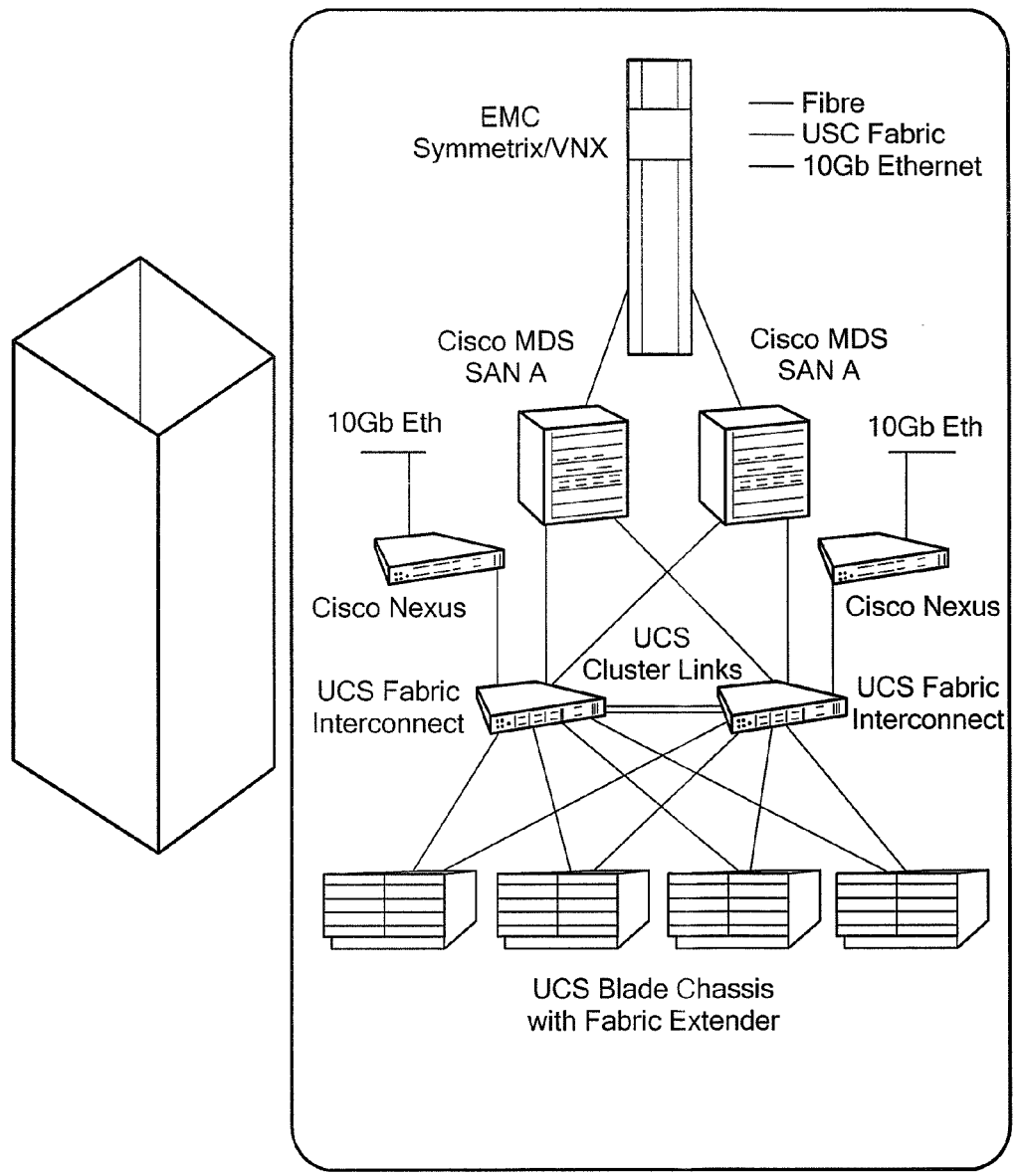
FIG. 7 is a schematic representation of an exemplary platform, shown as a vblock, having storage, compute and network resources.

FIG. 7 shows an exemplary VBLock having various components. Elastic provisioning refers to the steps required to provision "planned" resources for a service that was previously provisioned and or activated. Planned resources are added to a service at any time after the initial service is created and provisioned from a "service offering" which is a template of configurations for a service including but not limited to upper and lower bounds on resources that comprise the service. The service offering constraints are binding on all services created from it, but can be modified if one or more services need to grow beyond said constraints. The rules governing changing the service offering are that maximum limits can be increased and minimum limits can be diminished; no other types of modification can be allowed so as to prevent invalidating other managed services that might have been created from the said service offering.

One of the goals of elastic provisioning of a service/cluster is to bring online compute, network and storage resources without affecting the operation of a cluster that could be currently hosting virtual machines and applications. The elastic operations should be unobtrusive and should be accomplished without end users detecting the expansion/shrinkage of a cluster/service in question to ensure that there is no service interruption. Typically, elastic operations are performed when alerts are received from a cloud computing environment that the utilization of resources has hit certain thresholds. These thresholds can be pre-specified or determined by the constant monitoring of the cloud.

Elastically provisioning resources into an existing cluster in a cloud computing infrastructure is an extension of provisioning a cluster. The cluster comprises compute, storage and network resources. The requirements and purpose of a cluster can change dynamically post-deployment. Not having the capability to add and remove resources from the cluster makes the cluster rigid in terms of locking up resources that could have been used to provision other clusters or could lead to over-provision a cluster in anticipation of increased usage.

In exemplary embodiments of the invention, the system monitors and generates alerts for Vblock usage based on which the Vblock administrator can choose to perform elastic operations. In general, the types of storage are not mixed, except when there is native support to do so, such as EMC VNX which provides both block and file storage. Generally, types of compute blades are not mixed and types of network elements are not be mixed.

Elastic provisioning enables a range of additions and deletions from a cluster, such as:
  adding and removing a server (blade) to a cluster (includes provisioning this newly added server);
  making visible newly added servers (by integrating with products like VCenter)
  activating the server if the cluster has active servers—ensuring the added compute power is immediately available to handle load;
  adding and removing storage on the fly and have products like VCenter discover the newly added storage; and/or;
  adding and removing vLANs on vNICs associated with the servers.

In addition, users can use elastic provisioning in various stages of the deployment and usage of a cloud infrastructure. Defining the capacity and purpose of a cluster can be a long drawn process. Having the flexibility to add and remove components can improve the efficacy and accuracy of defining "canned clusters" by vendors who want to provide their customers with custom configuration. Once these clusters are deployed in the end customer's environment, the services can be tweaked even while they are actively supporting Virtual Machines and applications.

The elastic provisioning process itself has little or no effect on the operation and availability of the cluster. Once the elastic operation completes, the newly added resources are immediately available (or unavailable, if they were decommissioned) in the cluster, clearing any alerts for high (or low) usage and in an environment where Virtual Machines e.g. VMWare VCenter, can migrate from one host to another, the cluster should rebalance itself to optimal performance.

In one embodiment, when it is not possible to rebalance the cluster, elastic operations are not allowed and the user should get clear indications that the cluster was, for example, unable to remove resources due to constraints set on the infrastructure, primarily to enforce redundancy in the cluster.

In an exemplary embodiment, the universal infrastructure manager provisions infrastructure components using a plethora of workflows that have some knowledge of the underlying components. A meta-workflow pattern achieves the functionality to implement elastic provisioning of resources. Each of the nodes of the various workflows were made re-entrant and idempotent (such that provisioned resources are provisioned only once).

An exemplary meta-workflow invokes the following operations:
  Service/Cluster Provisioning, which includes:
    provisioning servers;
    provisioning storage;
      boot storage;
      shared storage;
    provisioning network (vNICs and vLANs);
  activation
    newly provisioned servers are activated (if the cluster had any active servers)
    active servers are not disturbed as they might be serving VMs and Applications
    servers can be marked for de-activation selectively. If they are marked as such, they remained turned off, and can then be selectively activated
  VCenter Sync
    newly added and provisioned servers are synced with VCenter
    newly added shared storage is synced with VCenter This three step approach requires that the sub-workflows understand what is and is not provisioned/activated/synced in the cluster and attempt the respective operations they are chartered to perform only on the resources that were added/removed.

Figure 8:
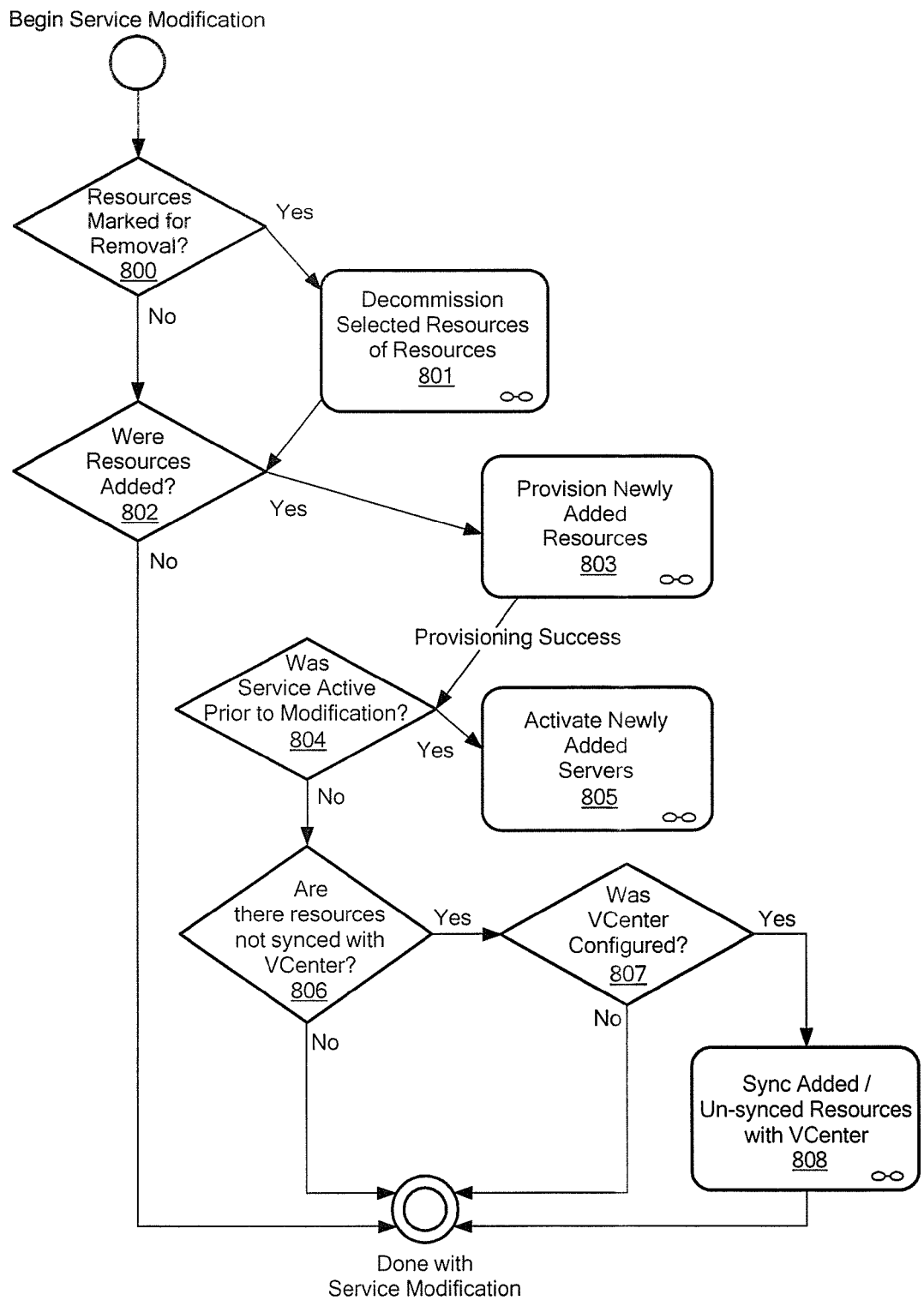
FIG. 8 is a flow diagram showing an exemplary sequence of steps for modifying a service to elastic add or remove a resource.

Additional requirements for the elastic provisioning of resources include:
  server provisioning
    newly added server should have the option to be provisioned (e.g. installing ESX Server)
    each newly added server should get its own boot storage (handled in storage provisioning)

each of the servers that are added as a part of the elastic operation should now have connectivity to the existing shared storage in the cluster storage Provisioning newly added shared storage should be visible to all the existing and newly added servers, and they should be so mapped network Provisioning vNICs cannot be added or removed without rebooting the server on the UCS only vLANs can be elastically added or removed on a given vNIC FIG. 8 shows an exemplary sequence of steps for modifying a service to either grow or shrink the service as determined by usage analysis and/or datacenter information. In one embodiment, all of the allowable modifications can be made simultaneously. UIM determines the resources that are "planned", meaning they are not yet provisioned or activated, and takes action to perform all the steps necessary to change the service as indicated by changing the managed service description, either through a GUI or public API.

In step 800, it is determined whether a user instruction was received to remove compute, storage or network resources from an existing service. If so, in step 801, the system systematically starts decommissioning the infrastructure components marked for removal. The servers are decommissioned first, then any file system resources, and ultimately the boot storage volumes of removed servers and any shared storage volumes are decommissioned on the storage array, as described more fully below.

In step 802, the system determines if any new resources were added to the managed service. If so, the newly added resources are provisioned in step 803. Servers and their boot storage are provisioned first (which may include installation of Operating System such as ESX/ESXi), followed by configuring all the newly added shared storage and making sure that newly added servers can see existing and newly added storage and conversely all the newly added storage is visible to existing servers in the service. Eventually, the newly added servers are configured to have the same network configuration as existing servers in the service, as described more fully below.

In step 804, the system determines whether the service was active before the modification was attempted, by means of inspecting the context of the activation status of the service. If so, the elastically added servers are also activated as a part of the modification process in step 805. The motivation for doing so is that the customer's intent could have been to improve the efficacy of or load balance a managed service, by adding new virtual servers that can start accepting new or migrated Virtual Machines from existing servers in the service. This obviates the user from invoking activation on elastically added resources into an active service to make them "available".

In steps 806 and 807 the system determines if there are any resources that are not synced with VCenter and whether the VCenter integration for the service was enabled, either in the Service Offering the service was created from, or if a VCenter instance and datacenter in VCenter were configured at another point in the service lifecycle. If the conditions in 806 and 807 are satisfied, then in step 808 the newly added (or previously un-synced) resources are synced with the VCenter. The VCenter sync is a best effort and performed on the entire service. The VCenter integration is equipped to discern which of the resources in the service require syncing with the VCenter cluster (the representation of the service in VCenter). Typically, hosts are shared data volumes are synced to the VCenter cluster. Also, any elastically decommissioned resources such as servers and shared data volumes will be removed in the VCenter cluster as well. If a VMWare VCloud Director instance, for example, is configured to work with the service, the provider VDC is accordingly updated in VCloud Director following the VCenter Sync. The sync to the VCloud Director is treated as a single step along with VCenter sync in UIM/P.

Figure 9:
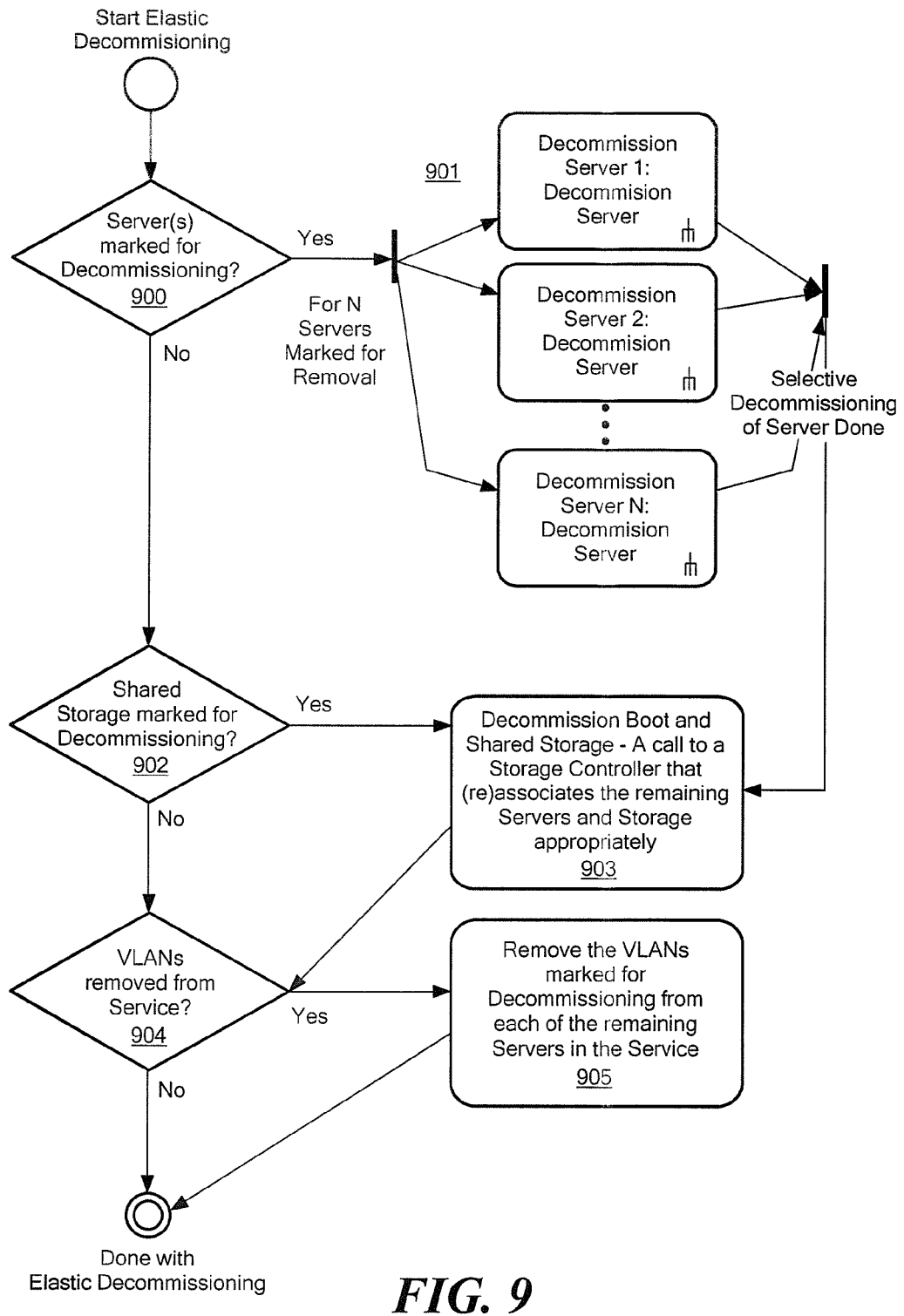
FIG. 9 is a flow diagram showing an exemplary sequence of steps to decommission a resource from a service.

FIG. 9 shows an exemplary set of steps to decommission selected resources from a service (elastically shrinking the service based on end-user requirements or reactively based on usage data alerts from the datacenter). In step 900 it is determined if any servers were marked for selective/elastic decommissioning. If so, a collection of such servers is fed into step 901 where each of the servers is individually decommissioned, as described more fully below.

In step 902 the system determines if any of the shared storage in the service is marked for decommissioning. If so, a list of servers which would continue to be a part of the service not-withstanding step 901 and storage volumes excluding the ones that are mentioned in the current step are passed down to a Storage Volume Controller in step 903, which updates the mappings as required. This expresses the final state of the servers and the storage that they are linked to and affecting the changes. These changes can potentially decommission storage volumes or file systems (e.g. EMC VNX) if the storage is not associated with any servers (indicating that they are unreachable in the cluster and the intent is understood to be deletion of the said storage).

In step 904 the system determines if any of the VLANs were marked as removed from the service. If so, this set of VLANs are removed from each of the remaining servers in the service, as the servers in the service/cluster have identical network configuration.

Figure 10:
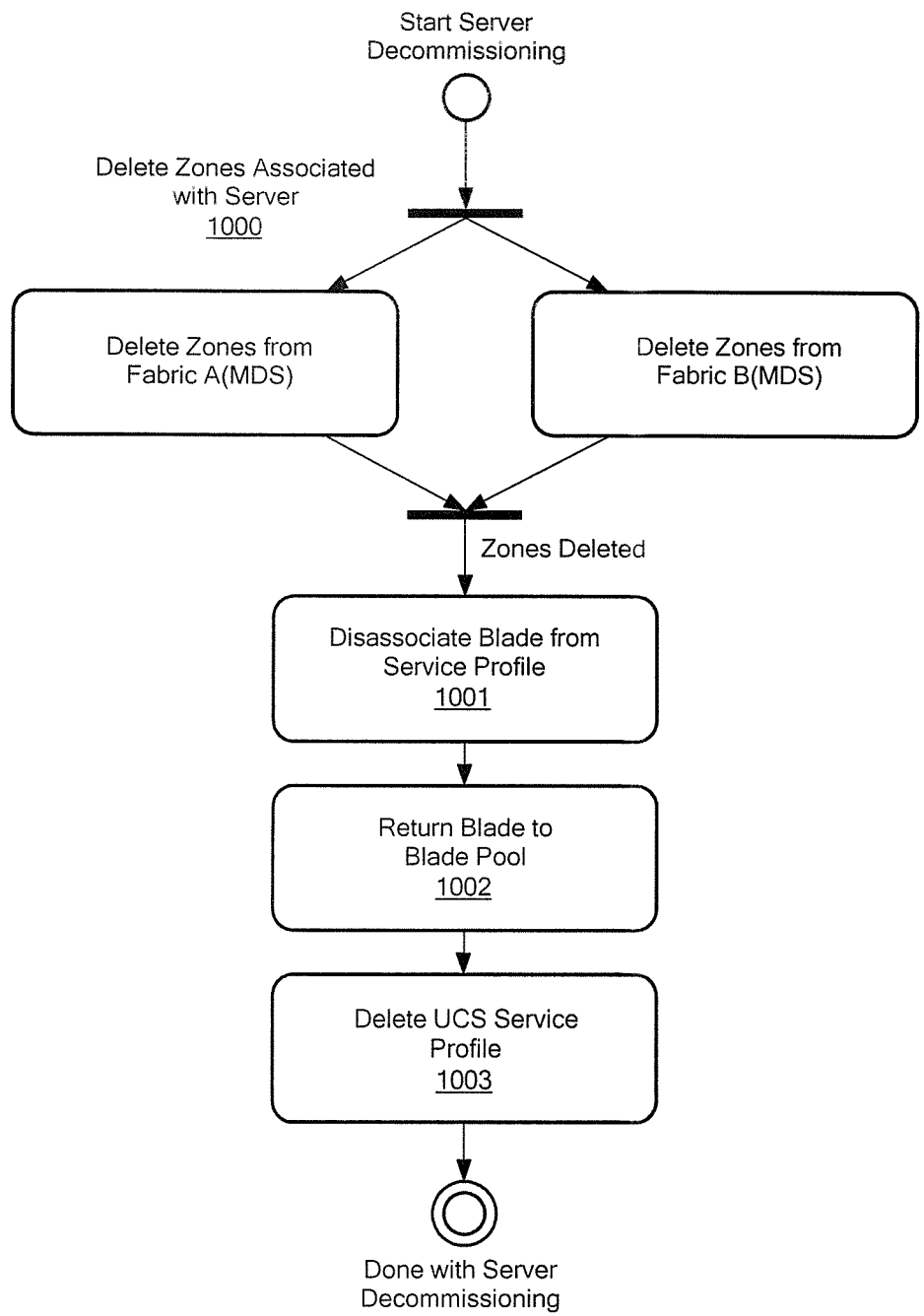
FIG. 10 is a flow diagram showing an exemplary sequence of steps for decommissioning a server.

FIG. 10 shows an exemplary set of steps to achieve decommissioning of a single server as referenced in FIG. 9. In step 1000 the zones in MDS A and B that represent the logical connections from the UCS Service Profile to the storage array are decommissioned. In step 1001, the system proceeds to release the blade that is bound to a service profile representing the server being decommissioned (if one is associated at the time the operation is attempted). Step 1002 then returns the blade to a pool of blades that can then be used to provision other servers that belong to the service or any other service belonging to the VBlock. Step 1003 completes the UCS cleanup of the server by deleting the service profile representing the server in question.

Figure 11:
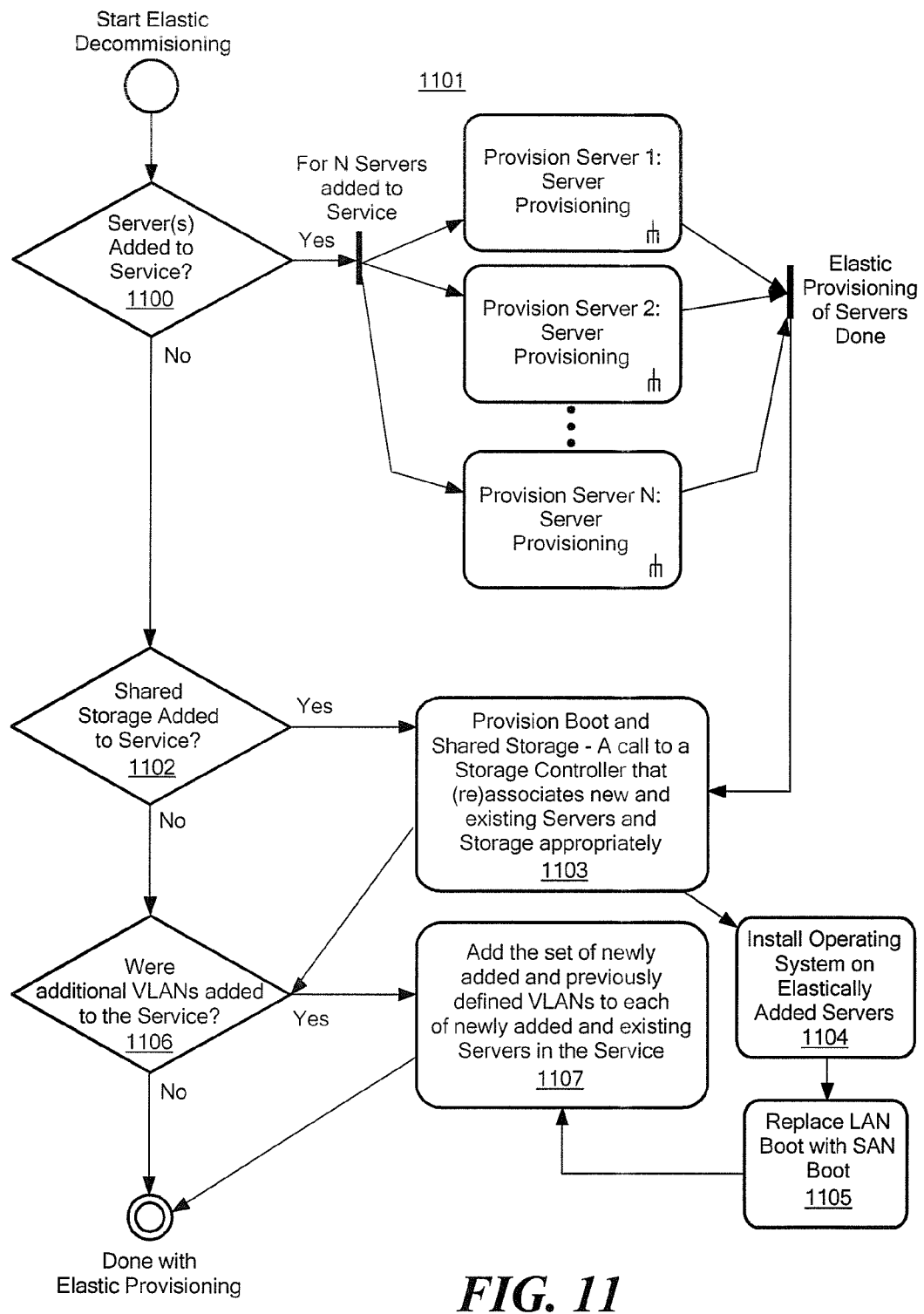
FIG. 11 is a flow diagram showing an exemplary sequence of steps for provisioning resources added to a service.

FIG. 11 shows exemplary set of steps to achieve provisioning of resources that may have been added to a service in the course of service modification, as shown in FIG. 8, steps 802 and 803. The user indicates by means of modifying the service description the desired configuration. The primary goal of elasticity is to understand what changes need to be affected in the various layers of the VBlock to achieve the desired logical configuration.

In step 1100 the system determines if any new servers ("elastic servers") were added to the service description. If so, the system then provisions a set of servers that were added to the service in step 1101 by invoking server provisioning, which is described below in conjunction with FIG. 12, for each of these N servers.

In step 1102, the system then determines if any shared storage was added to the existing service. This step is executed only if there were no added servers in steps 1100 and 1101. The result of the completion of step 1101 and the true evaluation in step 1102 leads to storage provisioning for the service. This step is re-entrant and by looking at the current and desired configuration of the storage connectivity (which might vary depending on the type of VBlock in question) a storage controller module then affects the required changes in step 1103.

When the boot and the shared storage is provisioned, the system then installs a suitable operating system in step 1104 as defined in the service offering of the service. The same operating system (if at all installed) that is installed on pre-existing servers is installed on the elastically added server(s). It is generally undesirable to change the operating system setting while performing elastic operations, though it is a supported option in UIM. A typical use case is that an updated version of the operating system is available. If a newer operating system is thus configured, it is assumed that the user has manually upgraded the operating system on pre-existing servers, and thus the intent is to install the newer operating system on all elastically added servers.

In step 1105, after the operating system is installed on each of the elastically added servers, the boot definition of the blades associated with these servers is replaced such that the blade can boot from the SAN (the boot storage that was provisioned earlier now has the operating system install/image). Hitherto, the boot definition was a LAN boot definition which enabled the operating system install in the first place.

In step 1106, the system determines if any additional VLANs were added as a part of the current service modification session, in the case where neither servers nor shared storage were added. If so, or at the completion of step 1105, the system executes step 1107 which performs the network configuration for all the elastically added servers in the service. In this step all newly added servers are configured according to the desired network configuration of the service and any existing servers are configured to have any additional VLANs that may have been added in this instance of executing service modification.

Figure 12:
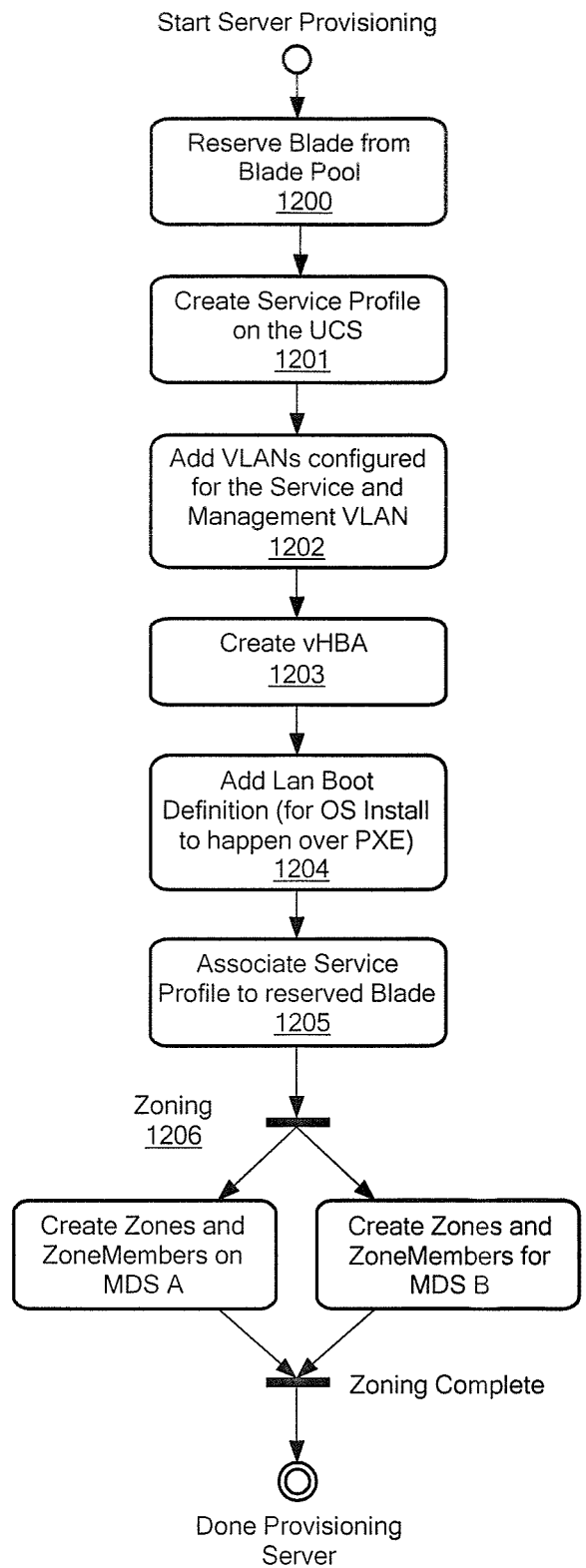
FIG. 12 is a flow diagram showing an exemplary sequence of steps for provisioning a server.

FIG. 12 shows an exemplary set of steps to perform server provisioning for a server (see. FIG. 11, Steps 1100 and 1101). Provisioning a server includes reserving a blade (so that operating system can be installed on the server) and creating and associating a service profile to the said blade. In step 1200 a blade is acquired and reserved from a blade pool of graded blades. Blade grades are a UIM categorization of the types of blades that can exist on the UCS. The limits on number and types of blades are defined in the service offering from which a service is initially created.

In step 1201 to 1204 a service profile is created on the UCS and various aspects of the functioning of a server are setup under the service profile object tree. In step 1202, the system creates a service profile, in step 1203 the system creates a virtual HBA, and in step 1204, the system adds LAN boot definitions. In step 1205 a fully created service profile is then associated to the blade that was reserved in step 1200. In step 1206, zones and zone members that allow access to the storage volumes associated with the servers and the service as a whole are created on MDS A and B physical components of the VBLock. The server is now staged and primed for installing an operating system over PXE.

Figure 13:
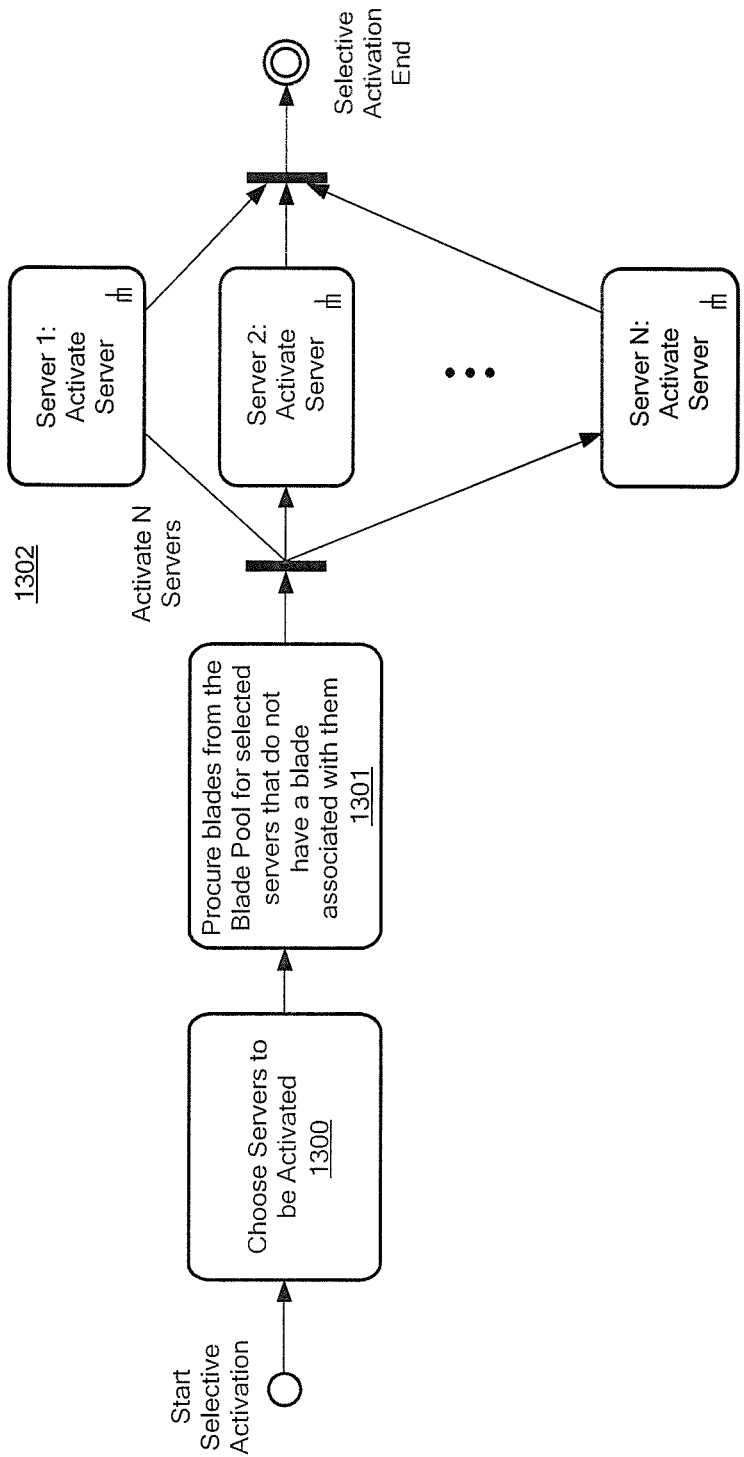
FIG. 13 is a flow diagram showing an exemplary sequence of steps for activating servers in a service.

As show in FIG. 13, users can choose to selectively activate servers in a service. In step 1300 the user selects from the list of (provisioned/inactive) servers the servers for activation. In step 1301, the system tries to acquire the necessary number of blades. In step 1302, one or more servers is activated by invoking steps detailed in FIG. 14, below.

Figure 14:
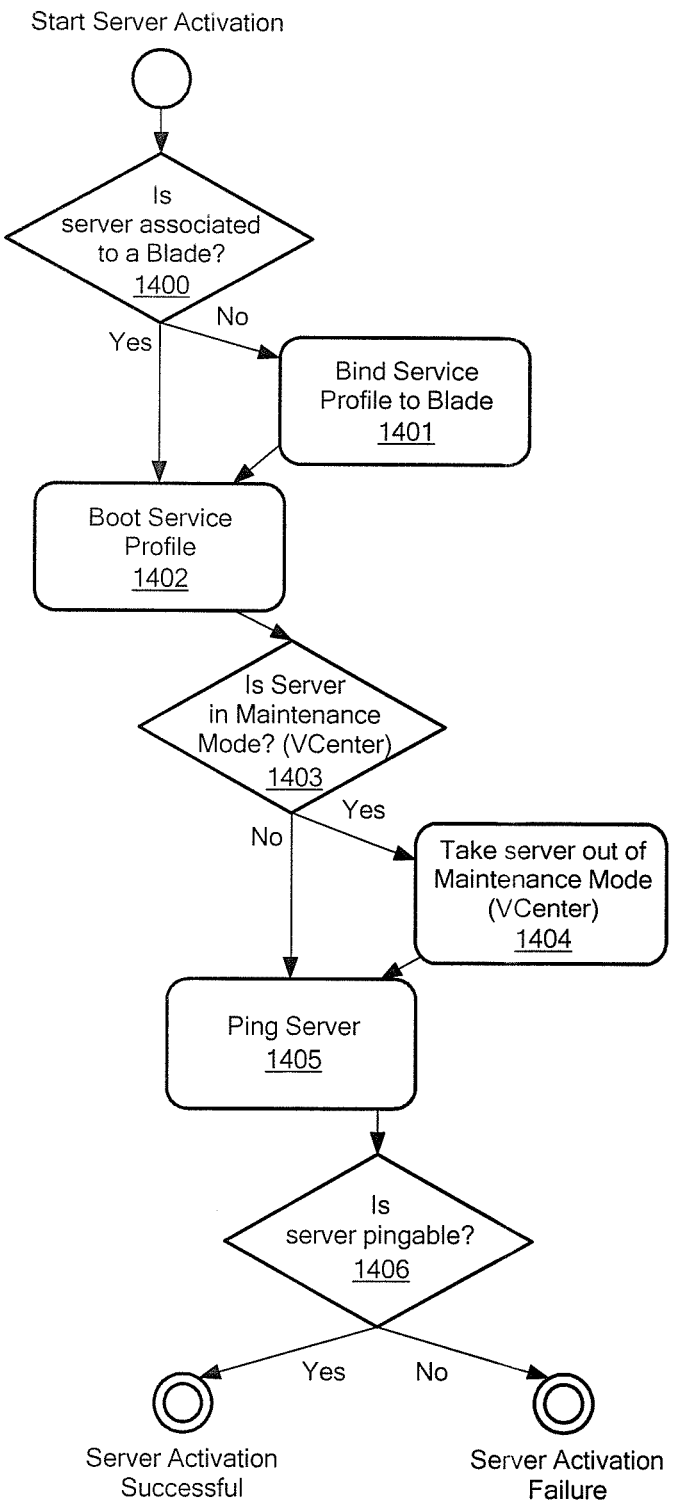
FIG. 14 is a flow diagram showing an exemplary sequence of steps for activating a server synchronized as a host.

FIG. 14 is an exemplary set of instructions to activate a server that may have been synchronized as a host with VCenter. In step 1400, a check is made to see if the server is already associated with a blade. If not, it is associated with a blade (previously procured in FIG. 13, step 1301) in step 1401. On the other hand, if the blade was already associated, the service profile is simply booted up/powered on. Once the service profile is booted, the system tries to determine in step 1403 whether the server is in maintenance mode under VCenter. If so, it is taken out of maintenance mode in step 1404 by invoking a VCenter API. In step 1405 an attempt to verify if the host is indeed booted up, a ping test is performed and in step 1406, the success of failure of the server activation is determined.

Similarly, selective deactivation can be affected on a service such that only a select few servers can be deactivated without having to bring the whole service down. While deactivating the option to disassociate the blade associated with the active server is presented to the user. If the server was synced with VCenter as a host, the host is first put into maintenance mode such that VMs running on the host can migrate to other active servers in service. If the VMs are not able to evacuate in the said fashion the deactivation is not attempted at all and the server remains in an active state. Such steps are taking so as to have a minimum amount of service interruption when blades need to be serviced, or specific servers need to be brought down due to any arbitrary reason.

In one embodiment, if a user wants to add (or remove) blades or storage such that it would violate the limits set in the service offering, then the user needs to edit the service offering prior to the addition/removal. When editing the service offering, the values for min/max for both storage and compute can be changed to any values that will not make any existing services created from the offering violate the constraints. If, for example, the service offering with min blades set to 5 and max to 15 has 2 services which use 8 and 12 blades respectively, then the legal min value is anything less than 9 and max is any value greater than 11.

In an exemplary embodiment, the system restricts editing of the service offering to privileged users. In order to allow users to expand/contract service beyond limits set in the service offering a user can edit service offering constraints. Editing of these constraints is available to generic user, but can be limited to select used, such as superusers or admin users with special privileges.

In an exemplary embodiment, the modified service can be checked for compliance as any other service that was not elastically grown or shrunk in UIM. The capability of being able to run service level compliance ensures correctness of configuration across multiple provisioning attempts.

Figure 15:
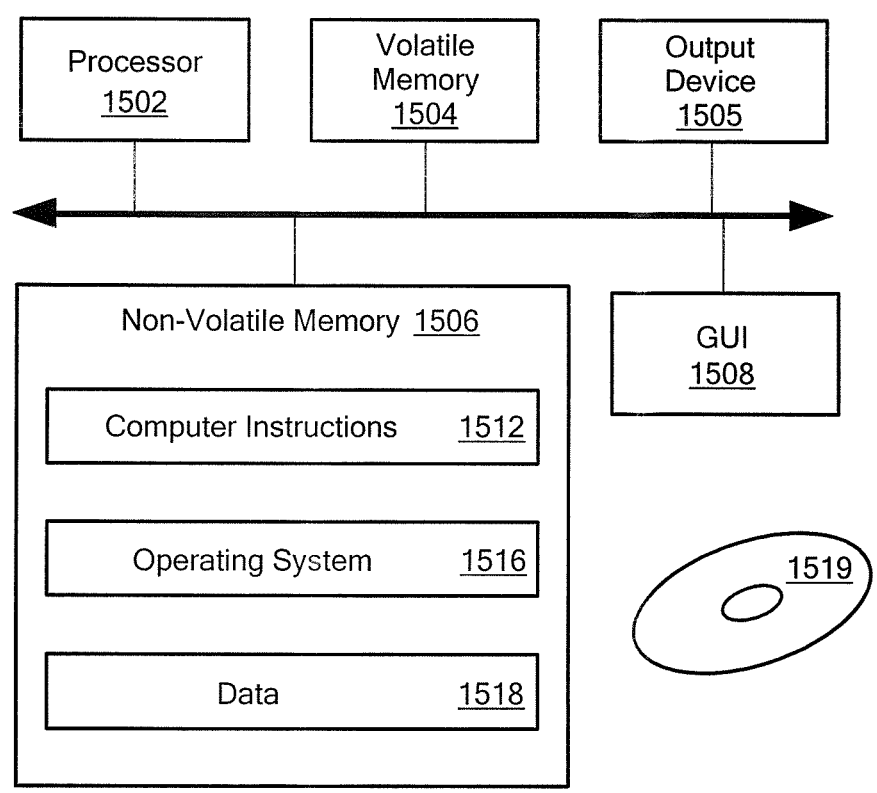
FIG. 15 is a schematic representation of an exemplary computer that may perform at least some of the processing described herein.

Referring to FIG. 15, a computer includes a processor 1502, a volatile memory 1504, an output device 1505, a non-volatile memory 1506 (e.g., hard disk), and a graphical user interface (GUI) 1508 (e.g., a mouse, a keyboard, a display, for example). The non-volatile memory 1506 stores computer instructions 1512, an operating system 1516 and data 1518, for example. In one example, the computer instructions 1512 are executed by the processor 1502 out of volatile memory 1504 to perform all or part of the processing described above. An article 1519 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
    in a cloud storage system having a compute layer, a network layer, a storage layer and a management layer, and a service having at least one server, boot storage for each of the at least one servers, shared storage for the at least one server, and a network profile to define networks over which traffic can flow,
    adding a compute, network, and storage layer resource to the service, wherein the compute, network, and storage layer resources comprise a server;
    provisioning the added compute, network, and storage layer resources;
    activating the provisioned compute, network, and storage layer resources into the already provisioned service with minimal interruption of the service to elastically add a resource to the service;
    provisioning boot and shared storage for the added server;
    reserving a blade in a blade pool associated with the added server;
    installing an operating system on the reserved blade;
    creating a service profile for the server;
    creating zones for the added server; and
    activating the added server.

2. The method according to claim 1, further including decommissioning one of the compute, network and/or storage resources in the service.

3. The method according to claim 2, further including adding the decommissioned one of the compute, network and/or storage resources back into a pool from which resources can be added to a service.

4. The method according to claim 1, further including adding a blade associated with the server.

5. The method according to claim 1, wherein the compute, network, and storage layer resources comprises storage.

6. The method according to claim 1, further including receiving an alert indicating additional storage is needed for the service, prior to provisioning additional storage to the already provisioned service.

7. The method according to claim 1, further including decommissioning a server by deleting zones from a fabric, disassociating a blade for the server from the service; and returning the blade to a blade pool.

8. The method according to claim 1, further including receiving a user request to add (or remove) blades and/or storage such that it would violate limits set in the service and receiving a user edit of the service limits prior to the addition/removal of the blades and storage.

9. The method according to claim 1, further including:
    making visible newly added servers by integrating with a virtualization server;
    activating the newly added server if the service has active servers;
    discovering newly added storage; and
    adding and removing vLANs on vNICs associated with the newly added servers.

10. The method according to claim 1, wherein the reserved blade is defined in a service offering from which the service is initially created.

11. An article, comprising:
    a computer readable medium having non-transitory stored instructions that enable a machine to perform:
    in a cloud storage system having a compute layer, a network layer, a storage layer and a management layer, wherein one of the compute, network, and/or storage layer resources comprises a server, and a service having at least one server, boot storage for each of the at least one servers, shared storage for the at least one server, and a network profile to define networks over which traffic can flow,
    adding a compute, network, and storage layer resource to the service;
    provisioning the added compute, network, and storage layer resources;
    activating the provisioned compute, network, and storage layer resources into the already provisioned service with minimal interruption of the service to elastically add a resource to the service;
    provisioning boot and shared storage for the added server;
    reserving a blade in a blade pool associated with the added server;
    installing an operating system on the reserved blade;
    creating a service profile for the server;
    creating zones for the added server; and
    activating the added server.

12. The article according to claim 11, further including instructions for decommissioning one of the compute, network and/or storage resources in the service.

13. The article according to claim 11, further including instructions for adding a blade associate with the server.

14. The article according to claim 11, wherein one of the compute, network, and/or storage layer resources comprises storage.

15. The article according to claim 11, further including instructions for receiving an alert indicating additional storage is needed for the service, prior to provisioning additional storage to the already provisioned service.

16. The article according to claim 11, further including instructions for decommissioning a server by deleting zones from a fabric, disassociating a blade for the server from the service; and returning the blade to a blade pool.

17. A system, comprising:
    a cloud storage system having a compute layer, a network layer, a storage layer and a management layer, wherein one of the compute, network, and/or storage layer resources comprises a server, and a service having at least one server, boot storage for each of the at least one servers, shared storage for the at least one server, and a network profile to define networks over which traffic can flow, the management layer comprising a processor and stored instructions to enable the system to:

add a compute, network, and storage layer resource to the service;

provision the added compute, network, and storage layer resources;

activate the provisioned compute, network, and storage layer resources into the already provisioned service with no interruption of the service to elastically add a resource to the service;

provision boot and shared storage for the added server;

reserve a blade in a blade pool associated with the added server;

install an operating system on the reserved blade;

create a service profile for the server;

create zones for the added server; and activate the added server.

* * * * *